United States Patent [19]

Inoue

[11] 3,875,302

[45] Apr. 1, 1975

[54] GELLED VINYL ALCOHOL POLYMERS AND ARTICLES THEREFROM

[75] Inventor: Taisei Inoue, Tokyo, Japan

[73] Assignee: Kuraray Co., Ltd., Kurashiki, Japan

[22] Filed: Aug. 7, 1973

[21] Appl. No.: 386,473

Related U.S. Application Data

[63] Continuation of Ser. No. 178,979, Sept. 9, 1971, abandoned.

[30] Foreign Application Priority Data

Sept. 16, 1970 Japan.................................. 45-81410
Mar. 26, 1971 Japan................................. 46-18116

[52] U.S. Cl...................... 426/1, 426/167, 426/350, 426/524
[51] Int. Cl............................................. A01n 17/14
[58] Field of Search .................. 426/1, 6, 167, 350; 260/29.6 B, 29.6 GM; 43/42.06; 424/78, 84; 252/315–317

[56] References Cited
UNITED STATES PATENTS

| | | | |
|---|---|---|---|
| 2,815,329 | 12/1957 | Germain | 252/316 |
| 2,979,778 | 4/1961 | Simons | 43/42.06 |
| 3,421,899 | 1/1969 | Humphreys | 426/1 |
| 3,579,895 | 5/1971 | Orn | 43/42.06 |
| 3,627,693 | 12/1971 | Scarpelli | 252/316 |
| 3,664,963 | 5/1972 | Pasin | 252/316 |
| 3,684,519 | 8/1972 | Combs | 426/167 |

OTHER PUBLICATIONS

Polimery 12/9, 1967, Labudyinska, pp. 411–414.

Chemical Abs., Vol 69, 1968, 3241–3246Y.

*Primary Examiner*—A. Louis Monacell
*Assistant Examiner*—Hiram H. Bernstein
*Attorney, Agent, or Firm*—Kaufman & Kramer

[57] ABSTRACT

A process is provided for preparing gelled vinyl alcohol polymers comprising freezing an aqueous solution of a vinyl alcohol polymer below about −5°C., and thereafter melting the frozen solution. Articles such as artificial bait prepared from said gelled vinyl alcohol polymers are also provided.

8 Claims, 1 Drawing Figure

PATENTED APR 1 1975   BEST AVAILABLE COPY   3,875,302
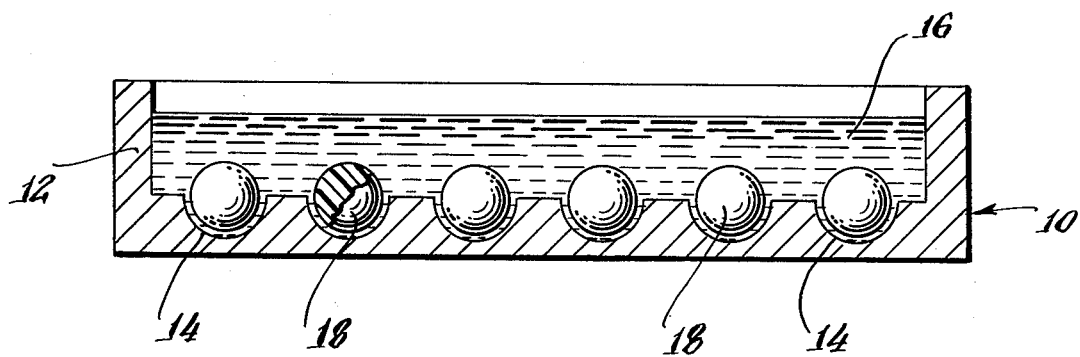

GELLED VINYL ALCOHOL POLYMERS AND ARTICLES THEREFROM

This is a continuation of application Ser. No. 178,979, filed Sept. 9, 1971, and now abandoned.

The present invention relates to a process for preparing gelled vinyl alcohol polymers which comprises freezing an aqueous solution of a vinyl alcohol polymer and thereafter melting the frozen solution. Theese gelled vinyl alcohol polymers exhibit excellent water resistance, elasticity and flexibility as well as excellent processability.

Gelled polyvinyl alcohol exhibiting satisfactory water resistance has heretofore been prepared by adding a polyvinyl alcohol cross-linking agent such as a polyvinyl alcohol reactive metallic salt or aldehyde to polyvinyl alcohol and subjecting the resulting mixture to irradiation or thermal treatment. These prior methods, however, are subject to several defects, such as for example, the economic disadvantages inherent in the required use of post treatment such as the addition of adjuvants and/or the use of irradiation or thermal treatment. Moreover the resulting gelatinous polyvinyl alcohol, although it exhibits satisfactory water resistance, also exhibits several disadvantageous physical properties. For example, it is generally hard, lacks elasticity and is difficult to process.

Accordingly, it is an object of the present invention to overcome the above-described deficiencies of previously obtained gelled polyvinyl alcohol.

It is another object of the present invention to provide gelled vinyl alcohol polymers exhibiting excellent water resistance, elasticity and flexibility as well as excellent processability.

These as well as other objects are accomplished by the present invention which provides a process for preparing gelled vinyl alcohol polymers comprising freezing an aqueous solution of a vinyl alcohol polymer below about $-5°C$., and melting the resultant frozen solution to obtain a gelled vinyl alcohol polymer.

In accordance with the present invention, gelled polyvinyl alcohol can be prepared by forming an aqueous solution of polyvinyl alcohol, casting it into a mold of metal or plastic, for example, and then freezing the solution within the mold at temperatures below about $-5°C$., and then melting the resulting frozen solution by allowing it to stand under ambient conditions of pressure and temperature that is, at atmospheric pressure and at room temperature or in water at room temperature, thereby melting the frozen solution.

The temperature of the freezing treatment strongly influences the water resistance, elasticity and flexibility of the gelled polyvinyl alcohol. When the freezing temperature is below about $-5°C$., the aqueous solution of polyvinyl alcohol is frozen and water remains inside micelles of highly oriented or crystallized polyvinyl alcohol so that high water resistance, elasticity and flexibility of the gel and excellent workability are obtained. When the freezing temperature is above about $-5°C$., the aqueous solution of polyvinyl alcohol is not frozen and water resistance is not imparted to the gelatinous polyvinyl alcohol. To obtain the most desirable water resistance, flexibility and elasticity freezing temperatures below about $-15°C$. and most preferably from $-15°C$. to $-50°C$. are employed.

The duration of the freezing treatment also influences the water resistance, elasticity, and flexibility of the gelled polyvinyl alcohol. Generally, a freezing period of from about 10 to about 50 hours is suitable. When the freezing period is less than 10 hours, insufficient water resistance, elasticity and flexibility are obtained. When the freezing period is effected for more than 50 hours, no additional benefits are obtained.

In accordance with the present invention, the frozen solution can be melted and then frozen again. Such repeated processing makes the structure of the gel more compact and improves the water resistance, elasticity and flexibility.

The vinyl alcohol polymers employed in the present invention encompass vinyl polymers having vinyl alcohol units, e.g., the product produced by partially or completely hydrolyzing polyvinyl esters, e.g., polyvinyl acetate, copolymers of vinyl alcohol and other monomers copolymerizable with vinyl alcohol. Any type of vinyl alcohol polymer can be employed as long as it is a water soluble polymer. Polyvinyl alcohol having a high hydroxyl group content in the molecule affords gelatinous polyvinyl alcohol exhibiting enhanced water resistance. For example, polyvinyl alcohol having 99.9 mole percent of hydroxyl groups in the molecule affords a gelatinous polyvinyl alcohol exhibiting water resistance in water at $50°C$. Polyvinyl alcohol having less than 90 mole percent of hydroxyl groups can provide gelatinous polyvinyl alcohol of high flexibility. The degreee of polymerization of the polyvinyl alcohol employed exerts a stronger influence over the processability of the gelatinous polymer obtained than over the other physical properties thereof. Polyvinyl alcohol having a high degree of polymerization cannot be cast smoothly into a metallic mold because of the excessively high viscosity of its aqueous solution. Conversely, polyvinyl alcohol with too low a degree of polymerization is also inconvenient to handle because of its extremely low viscosity. Thus, an effective degree of polymerization is generally between about 500 to 2000.

The concentration of the aqueous solution of polyvinyl alcohol exerts an influence over the flexibility of the gelled polyvinyl alcohol. Thus, when an aqueous solution of less than 5 weight percent of polyvinyl alcohol is used, gelled polyvinyl alcohol is obtained which is extremely flexible and exhibits a Shore Durometer hardness below $30°$ without the addition of a plasticizer (Shore Durometer hardness obtained in accordance with Japanese Industrial Standard JIS Z2246 employing Shore hardness testing machines in accordance with JIS B7727). When an aqueous solution of more than about 10 weight percent of polyvinyl alcohol is employed, gelatinous polyvinyl alcohol exhibiting a Shore Durometer hardness above $50°$ can be generally obtained. Generally, concentrations of polyvinyl alcohol in the aqueous solution ranging from about 5 to about 40 weight percent are suitable.

In the preparation of the gelled vinyl alcohol polymers of the present invention, any desired colorants such as dyestuffs and pigments can be added to the aqueous solution thereof to impart coloration and the like. Also short fibers and non-woven fabric or textiles can also be added thereto to provide reinforcement. If desired, fillers, perfumes, deodorizing agents, fish attractants, fertilizers, plasticizers and the like can also be added.

The viscosity and fluidity of an aqueous solution of polyvinyl alcohol can be adjusted without altering the amount of polyvinyl alcohol present by adding gelling agents such as boric acid or borax to the aqueous solution of polyvinyl alcohol.

Table I below illustrates typical physical properties of the gelled vinyl alcohol polymers obtained in accordance with the present invention. A comparison with a control wherein the aqueous solution was dried for four hours at 80°C. is also provided.

TABLE I

| Conditions for treatment | CONTROL | EXAMPLE 1 | EXAMPLE 2 | EXAMPLE 3 |
| --- | --- | --- | --- | --- |
| Mold type | Casting | Casting | Casting | Casting |
| Hydroxyl group in PVA(mole%) | 89.0 | 89.0 | 99.9 | 80.5 |
| Polymerization degree | 1750 | 1750 | 1730 | 500 |
| Concentration (wt.%) PVA | 10 | 10 | 7 | 15 |
| Temperature (°C.) for freezing | Dried for 4 hours at 80°C. | −30 | −40 | −10 |
| Time for freezing(hour) | | 24 | 24 | 15 |
| Physical Data | | | | |
| Solubility in water(30°C.) (wt.%) | 97.0 | 0 | 0 | 0.2 |
| Solubility in water(50°C.) (wt.%) | 100.0 | 0.4 | 0 | 13.5 |
| Shore Durometer hardness | 97 | 40 | 44 | 31 |
| Elongation rupture (%) | 115 | 556 | 510 | 682 |
| Resilience (%) | 2.1 | 41.0 | 42.0 | 49.5 |

When globules of gelled vinyl alcohol polymers are desired, they can be prepared in accordance with the present invention by compactly filling a globular metallic or plastic mold which is adapted to be sealed with an aqueous solution of a vinyl alcohol polymer. Generally, vacuum filling techniques are required. These techniques can sometimes be troublesome. Accordingly, the following method is considered suitable for conveniently obtaining globules of gelatinous vinyl alcohol polymers. Upon addition of an aqueous solution of polyvinyl alcohol to a liquid, non-solvent for polyvinyl alcohol which is substantially incompatible with water, the aqueous solution of polyvinyl alcohol assumes a globular form. The resulting mixture is frozen at temperatures below about −5°C. and then the frozen mass is brought to room temperature under ambient conditions or placed in water at room temperature to allow the ice to melt to give globular gelled vinyl alcohol polymers.

The liquid non-solvent employed herein includes vegetable oils such as castor oil, soybean oil, sesame oil and the like, mineral oils such as kerosene, gasoline or machine oil, fish oils or animal oils such as squid oil, mackerel oil, pike oil, sardine oil, lard oil and the like and organic solvents such as toluene, trichloroethylene, liquid paraffin and the like. The specific gravity of these liquid non-solvents must be equal to or less than that of the aqueous solution of polyvinyl alcohol.

The aqueous solution of polyvinyl alcohol is preferably added to the liquid non-solvent intermittently in fixed amounts whereby many globules of the gelatinous polymer can be obtained. Any vessel having a planar bottom can be used to contain the liquid non-solvent and form the globular gelled vinyl alcohol polymers upon addition of the aqueous solution of a vinyl alcohol polymer.

For obtaining gelled polymers having a form close to a true globe, however, it is considered preferable to employ a vessel such as that shown in the drawing. The drawing is an elevation view of a vessel in cross section.

Referring now to the drawing, the vessel 10 is comprised of a continuous wall 12 having a plurality of semi-globular concave depressions 14 in the upper surface of the bottom thereof. The vessel 10 is filled with the liquid non-solvent 16 and an aqueous solution of polyvinyl alcohol is added dropwise in fixed amounts into the concave depressions 14 on the bottom of the vessel 10 whereby globules 18 of gelled polyvinyl alcohol exhibiting a form close to a true globe can be obtained. In the preparation of these globules, it is considered preferable to add the aqueous solution of polyvinyl alcohol to the liquid nonsolvent with as little disturbance as possible. Thus, it is considered preferable to avoid imparting any vibrations, trembling or stirring to the contents of the vessel. The size of the globular gelled polymer is determined according to the specific amounts of the aqueous solution of polyvinyl alcohol added and the size of the semi-globular concave depressions 14 in the bottom of the vessel 10. When the amount of polyvinyl alcohol added and the size of the concave depressions are large, gelled polymers having large diameters can be obtained. If desired, however, by suitably adjusting the amount of polyvinyl alcohol added or by using a vessel having smaller concave depressions therein, smaller diameter globules can be obtained. In order to obtain a uniform size of the gelled polymers, the amount of the aqueous solution of polyvinyl alcohol to be added must always be constant.

Various sizes of globular gelled polymers can be obtained in accordance with the present invention. Generally, the globules are formed in diameters ranging from about 2 to about 10 millimeters.

The amount of the liquid non-solvent employed is preferably adjusted so that the globular material formed from the aqueous solution of polyvinyl alcohol is formed below the surface of the liquid non-solvent when the aqueous solution of polyvinyl alcohol is added to the vessel containing the liquid non-solvent.

The gelled polymers of polyvinyl alcohol obtained in accordance with the present invention and the globular gelled polymers as well can be used, for example, as carriers of bait for fishing or use in fisheries or carriers of deodorizing agents, fertilizer and the like.

Generally, raw cuttlefish, mackerel, pike, sardines and the like have heretofore been employed as fishing bait; however, the supply of such fish are becoming insufficient for use as bait. To compensate for this, attempts have heretofore been made to employ plastic sponge or soft thermoplastic resins as fishing bait; however, these have been found to be ineffective because the sponge and soft thermoplastic resin were so hydrophobic as to not be alluring to fish.

Employing the gelatinous polyvinyl alcohol of the present invention, a fishing bait can be obtained which is hydrophilic and the ratio of its water content to its solids content is similar to that of raw bait. Moreover, the flexibility and softness thereof are also similar to those of raw bait with the result that the fishing bait thus obtained is quite attractive for fish. Furthermore, fish hooks are stably retained within the fishing bait. Still further, the stability and water resistance of the fishing bait thus obtained are quite satisfactory.

The fishing bait of the present invention can be prepared by forming an aqueous mixture of polyvinyl alcohol and a fish attractant and pouring the resultant mixture into a mold of metal or plastic and then freezing said mixture at temperatures below about −5°C. and then thawing or melting the frozen mixture in air or water at room temperature to melt the ice that forms.

The fish-attractants to be used in the present invention are generally fish powders, minced fish, fish oil such as cuttlefish oil and stale fish as well as shell fish. They can preferably be added to the polyvinyl alcohol solution in amounts ranging from about 30 to about 200 wt.% of solution. Also, the fish attractant can be synthetic spices having a smell similar to that of fish meat, fish oil, stale fish or shell fish. The quantity of the synthetic spice to be added is not considered critical and can vary widely.

When colored fishing bait is desired, any colorant such as a dyestuff or pigment can be added to the aqueous mixture of polyvinyl alcohol and the fish attractant. When necessary or desired, fillers, plasticizers and other additives can also be added.

The following examples further illustrate the present invention. Unless otherwise stated, all percentages and parts are by weight.

EXAMPLE 1

To 100 parts of a 10 wt.% aqueous solution of polyvinyl alcohol (polymerization degree 1730, saponification degree 99.9 mole %), there was added 6 parts of fish meal, 2 parts of fish-oil fermented material, 3 parts of scaly aluminum powder and 0.5 part of blue pigment. The resultant mixture was dispersed uniformly and poured into a metallic fish mold similar to a form of Engraulis japonica. The mold was sealed and the mixture frozen at −30°C. for 24 hours. Thereafter, the mold was placed in water maintained at 30°C. for 2 hours to melt the ice. The mold was then opened and the gelled polyvinyl alcohol, molded and fixed in the form of a fish, was removed. The gelled polyvinyl alcohol exhibited an appearance very similar to living fish. It also exhibited excellent elasticity and flexibility. When dipped in a 3 percent aqueous saline solution at 30°C. for 72 hours, excellent water resistance of the gelled polymer was confirmed. No deformation or disintegration was observed. The fish hook was retained within the gelled polymer in a stable manner. The retention of the fish attractant within the gelled polymer during this period was also satisfactory.

Thus, this example demonstrates that the gelled polymers of the present invention are useful as artificial baits for tuna such as tunny and bonito.

EXAMPLE 2

Two parts of Evapon (trademark of Taisho Pharmaceutical Co., Ltd. for a deodorizing agent) was added to 100 parts of a 13 wt.% aqueous solution of polyvinyl alcohol (polymerization degree 550, saponification degree 88 mole %) containing 5 mole % of carboxyl groups. The resultant mixture was cast into a metallic mold having a thickness of 5 millimeters, a breadth of 10 millimeters and a length of 50 millimeters. The mold was sealed and the mixture contained therein frozen at −10°C. for 8 hours. Thereafter, the metallic mold containing the frozen mixture was allowed to sit at atmospheric pressure and at room temperature in order to melt the ice that had formed. Thereafter, the gelled polymer was removed from the mold.

The gelled polyvinyl alcohol exhibited excellent flexibility and a Shore Durometer hardness of 38°. The duration of the odor emanating from the gelled polymer was determined by suspending the gelled polymer in a thermostatically controlled water bath at 20°C. The odor continued for about 10 days. On the other hand when 0.05 grams of the identical deodorizing agent was added to a thermostatically controlled water bath under identical conditions, the odor continued for only 24 hours.

This example illustrates the advantageous use of the gelled polyvinyl alcohol of the present invention as a carrier for deodorizing agents.

EXAMPLE 3

To 100 parts of a 10 wt.% aqueous solution of polyvinyl alcohol (polymerization degree 1750, saponification degree 99 mole %), there was added 5 parts of Sunekis (trademark of Sunekis Co., Ltd. for a fish attractant agent), 5 parts of salmon roe juice and 0.1 part of yellow dyestuff. The resultant mixture was agitated to effect a uniform dispersion. 0.5 Gram each of the above mixture was added dropwise into the concave depression 14 in the bottom of the vessel 10 shown in the drawing. The vessel had a depth of 2 centimeters and a diameter of 12 centimeters, the diameter of the concave depressions in the bottom of the vessel was 1 centimeter. The concave depressions were filled with squid oil to a depth of 1 centimeter. Upon addition of the aqueous solution of polyvinyl alcohol, the polyvinyl alcohol became globular.

The vessel containing the globules of polyvinyl alcohol was frozen at −20°C. in a freezer for 24 hours and was then taken out into the atmosphere to melt the ice under ambient conditions. The gelled polyvinyl alcohol having a diameter of about 9 millimeters was recovered by filtration.

The gelled polymer thus obtained had an appearance and touch very similar to that of salmon roe. The fish hook was stably retained within the globule and the bait retention in water was better than that of natural sardines. Thus, the synthetic bait can be advantageously employed for fishing.

EXAMPLE 4

To 100 parts of a 13 wt.% aqueous solution of polyvinyl alcohol (polymerization degree 550, saponification degree 88 mole %) containing 5 mole % of carboxyl groups, there was added 2 parts of Evapon (trademark of Taisho Pharmaceutical Co., Ltd. for a deodorizing agent), and the resultant mixture was admixed to effect a uniform dispersion. 1 Gram aliquots of the mixture were added dropwise into the concave depressions in the bottom of a vessel as shown in the drawing, said vessel having a depth of 2 centimeters and a diameter of 12 centimeters with the concave depressions in the bottom of the vessel having a diameter of 1.2 centimeters. The vessel was filled with toluene. The added mixture filled the depressions to a depth of 1.5 centimeters. In this manner, globules of polyvinyl alcohol were formed in the toluene.

The vessel containing the globules was frozen at −10°C. for 10 hours and was then placed at room temperature and pressure whereby the ice melted. The globules of gelled polyvinyl alcohol containing the deodorizing agent had a diameter of about 12 millimeters and were recovered by filtration.

To determine the duration of odor retention, 3 grams of the gelled polymer was placed in a cloth sack and suspended in a thermostatically controlled water bath at 20°. In this manner, it was found that the odor continued for 8 days. In comparison, 0.06 grams of the deodorizing agent "Evapon" was added to a thermostatically controlled water bath of the same volume and the same temperature and the odor was found to continue for only 24 hours.

This example further illustates that the globular gelled polyvinyl alcohol obtained by the present invention is useful as a carrier for deodorizing agents.

EXAMPLE 5

To 100 parts of a 10 wt.% aqueous solution of polyvinyl alcohol (polymerization degree 1400, saponification degree 90 mole %), there are added 10 parts of "Family" (trademark of Mitsubishi Chemical Industries, Ltd. for complex chemical fertilizer). The solution was placed in a metallic vessel having a depth of 3 centimeters, a width of 15 centimeters and a length of 20 centimeters. The solution was frozen in the vessel at −25°C. for 24 hours and was then placed under atmospheric pressure and room temperature to melt the ice that formed. The resulting gelled polyvinyl alcohol was placed in a cloth sack and suspended in sea water around a net for laver culture. The fertilizer contained in the gelled polymer gradually dissolved in sea water and was effectively utilized for laver culture.

EXAMPLE 6

To 100 parts of a 10 wt.% aqueous solution of polyvinyl alcohol (polymerization degree 1730, hydroxyl content 99.9 mole %), there was added 8 parts of short fibers (rayon fiber having a length of 16 mm.), 6 parts of fish meal, 2 parts of fish oil fermented material, 3 parts of scaly aluminum powder and 0.5 part of blue pigment, and the resultant mixture was admixed to effect a uniform dispersion. The resulting mixture was cast into a fish form of metallic mold resembling a form of Englaulis japonica. The mold was sealed and the contents thereof frozen at −30°C. for 20 hours. Thereafter the mold was placed in water maintained at 30°C. for 2 hours to allow the frozen portions thereof to thaw. Thereafter the mold was opened and the gelled polyvinyl alcohol was removed. The gelled polyvinyl alcohol as removed was molded and fixed in the form of a fish. The gelled polyvinyl alcohol exhibited an appearance resembling that of a a living fish and also exhibited excellent elasticity and flexibility. The molded polymer was dipped in a 3% saline solution for 72 hours at 30°C. whereby excellent water resistance was noted without deformation or disintegration. The fish hook was satisfactorily retained within the gelled polymer and the duration of retention of the fish attractant was found to be satisfactory. The resulting fishing lure was found to be useful as artificial bait for tunny and bonito in place of known live bait.

EXAMPLE 7

To 100 parts of a 10 wt.% aqueous solution of polyvinyl alcohol (polymerization degree 1730, hydroxyl content 99.9 mole %), there was added 6 parts of fish meal, 2 parts of fish oil fermented material, 3 parts of scaly aluminum powder and 0.5 part of blue pigment. The resulting mixture was admixed to effect a uniform dispersion and was cast into a metallic fish mold resembling Englaulis japonica. The polymer was reinforced by the addition of a nonwoven fiber made of "Vinylon" (trademark of Kuraray Co., Ltd. for polyvinyl alcohol fiber). The mold was sealed and the contents thereof frozen at −30° for 24 hours. Thereafter the mold was placed in water maintained at 30°C. for 2 hours to allow the frozen portions of the polymer mixture to thaw. Thereafter the mold was opened and the gelled polyvinyl alcohol which was molded and fixed in a form of a fish was removed.

The gelled polyvinyl alcohol exhibited an appearance resembling that of a living fish and also exhibited excellent elasticity and flexibility. The gelled polymer was dipped in a 3% saline solution at 30°C. for 72 hours during which time excellent water resistance was observed without the occurrence of any observable deformation or disintegration. The fish hook was stably retained within the gelled polymer and the duration of retention of the fish attractant was found to be satisfactory. It was found that the artificial bait prepared as described hereinabove was useful for catching tunny and bonito in place of known live bait.

EXAMPLE 8

Into 100 parts of a 10 wt.% solution of polyvinyl alcohol (having a degree of polymerization of 1730 and a hydroxyl content of 99.9 mole %), there was added 10 parts of fish meal, 2 parts of fermented fish oil, 3 parts of scaly aluminum powder and 0.5 part of blue pigment. The resulting mixture was homogeneously dispersed and then poured into a mold and sealed. The mold was then maintained at −30°C. for 24 hours and then transferred into water maintained at 30°C. After 2 hours, the mold was opened and the molded gel was taken out and sliced into appropriate sized slices.

This gel-like substance exhibited elasticity and flexibility similar to that of raw fishing bait and was so water resistant that the gel was not changed or broken even after 72 hours immersion in a 3% salt solution at 30°C. Furthermore, it was found that fish hooks were retained quite stably within the gel and that the gel was effective as fishing bait for a long period of time. This artificial bait was found to be effective as bait on fishing hawser with lines and hooks for tunny and bonito in place of raw fishing bait.

EXAMPLE 9

To 100 parts of a a 13 wt.% aqueous solution of polyvinyl alcohol (having a degree of polymerization of 550, a hydroxyl content of 88 mole % and a carboxyl content of 5 mole %), were added 10 parts of fish powder made from sardine, mackerel and pike. Said fish powder was dispersed within said solution. The resulting mixture was poured into a mold of the type described in Example 8. The mold was then sealed and maintained at −10°C. for 8 hours. Thereafter the mold was transferred to air maintained at room temperature and the gel was then recovered from the mold.

The polyvinyl alcohol gel thus obtained exhibited excellent flexibility and a Shore Durometer hardness of 38°. The gel was suspended in water maintained at 20°C. to check the durability of the fish smell. It lasted for about 8 days. The gel was found to be effective as bait on fishing hawser with lines and hooks for seabream and tunny.

EXAMPLE 10

Employing the procedure described in Example 8 and adding 25 parts of squid oil as the fish attractant, a gelled polyvinyl alcohol fishing bait was obtained. The fishing bait was found to be effective as bait on fishing hawser with lines and hooks for tunny, bonito, seabream, rock fish and pollack.

EXAMPLE 11

To 100 parts of a 10 wt.% aqueous solution of polyvinyl alcohol (polymerization degree 1730, saponification degree 98 mole %), there was added 15 parts of minced mackerel, 10 parts of kaolinite clay and 0.2 part of red dyestuff, the resultant mixture was mixed to effect a uniform dispersion and then poured into a metallic mold (depth 2 centimeters × width 2.5 centimeters × length 20 centimeters). The vessel was sealed annd the contents thereof were frozen at −25°C. for 24 hours. The vessel was then placed under atmospheric pressure at room temperature to allow the frozen material to thaw. The thus obtained gelled polymer was found to be effective as bait in baskets for crab.

EXAMPLE 12

To 100 parts of a 10 wt.% aqueous solution of polyvinyl alcohol was added 10 parts of minced mackerel and pike and the resulting mixture was admixed to effect a uniform dispersion. The resultant mixture was then poured into a metallic vessel (depth 1.3 centimeters × with 2.5 centimeters × length 23 centimeters), the vessel was sealed and contents thereof frozen at −25°C. for 24 hours. Thereafter the vessel was placed under atmospheric pressure at room temperature to allow the frozen contents thereof to thaw. The gelled polyvinyl alcohol that was recovered was found to be effective as bait on fishing hawser with lines and hooks for tunny and bonito.

Although specific materials and conditions were set forth in the above exemplary processes in making and using the gelled vinyl alcohol polymers of this invention, these are merely intended as illustrations of the present invention. Various other vinyl alcohol polymers, fish attractants, additives and processes such as those listed above may be substituted in the examples with similar results.

Other modifications of the present invention will occur to those skilled in the art upon a reading of the present disclosure. These are intended to be included within the scope of this invention.

What is claimed is:

1. A gelled polyvinyl alcohol polymer having a degree of polymerization of between about 500 and 2000 and containing a fish attractant, said gelled polyvinyl alcohol polymer having a ratio of water content to solids content similar to raw fish bait and a flexibility and softness similar to raw fish bait and exhibiting retarded leaching of said fish attractant, said gelled polyvinyl alcohol polymer prepared by a process comprising admixing said fish attractant with an aqueous solution consisting essentially of water and from about 5 to about 40 wt.% of a vinyl alcohol polymer, freezing said admixture at a temperature below about −5°C. for a period of from about 10 to about 50 hours, and melting the resultant frozen solution to obtain said fish attractant-containing gelled polyvinyl alcohol polymer.

2. A gelled polyvinyl alcohol polymer as defined in claim 1 wherein the aqueous solution is frozen at a temperature below about −15°C.

3. A gelled polyvinyl alcohol polymer as defined in claim 2 wherein the aqueous solution is frozen at a temperature of from −15°C. to −50°C.

4. A gelled polyvinyl alcohol polymer as defined in claim 1 wherein, after the frozen solution is melted, it is at least once again frozen and then melted.

5. The gelled polyvinyl alcohol polymer of claim 1 wherein globules of said polymer are formed by a process comprising intermittently adding an admixture of fish attractant and an aqueous solution consisting essentially of water and from about 5 to 40 wt.% of a vinyl alcohol polymer to a liquid non-solvent for the vinyl alcohol polymer which is substantially incompatible with water, said liquid non-solvent exhibiting a specific gravity which is equal to or less than that of the aqueous solution of the vinyl alcohol polymer, whereby the aqueous solution of vinyl alcohol polymer assumes a globular form, freezing the admixture in said liquid non-solvent at a temperature below about −5°C., and melting the resultant frozen mixture to obtain globules of gelled vinyl alcohol polymer.

6. A gelled polyvinyl alcohol polymer as defined in claim 1 which additionally contains a colorant, said colorant being admixed with the aqueous solution.

7. A gelled polyvinyl alcohol polymer as defined in claim 1 which additionally contains reinforcing fibers or fabric, said fibers or fabric being admixed with the aqueous solution.

8. A process of manufacturing a hydrophilic fishing bait having a ratio of water content to solid content similar to raw bait and a flexibility and softness similar to raw bait, and a retarded leaching characteristic, comprising the steps of forming an aqueous mixture of from about 5 to 40 wt.% of a polyvinyl alcohol having a degree of polymerization between about 500 and 2000 and a fish attractant, freezing said mixture at a temperature below about −5°C. for a period of from about 10 to about 50 hours, and melting the frozen mixture to obtain said hydrophilic fishing bait.

* * * * *